United States Patent
van Seeventer et al.

(10) Patent No.: US 9,649,611 B2
(45) Date of Patent: May 16, 2017

(54) METHOD FOR ENCAPSULATION OF AN EDIBLE OIL, COMPOSITIONS COMPRISING EDIBLE OIL AND THE USE THEREOF

(75) Inventors: Paul Bastiaan van Seeventer, Meppel (NL); Marieke Houkje Geertjes, Assen (NL); Albert Thijs Poortinga, Apeldoorn (NL); Hendrik Vos, Rouveen (NL)

(73) Assignee: FRIESLAND BRANDS B.V., Amersfoort (NL)

( * ) Notice: Subject to any disclaimer, the term of this patent is extended or adjusted under 35 U.S.C. 154(b) by 285 days.

(21) Appl. No.: 13/384,420

(22) PCT Filed: Jul. 16, 2010

(86) PCT No.: PCT/NL2010/050462
§ 371 (c)(1),
(2), (4) Date: Feb. 10, 2012

(87) PCT Pub. No.: WO2011/008097
PCT Pub. Date: Jan. 20, 2011

(65) Prior Publication Data
US 2012/0128831 A1 May 24, 2012

(30) Foreign Application Priority Data
Jul. 17, 2009 (NL) ..................... 2003224

(51) Int. Cl.
| | | |
|---|---|---|
| *A23D 9/05* | (2006.01) | |
| *B01J 13/04* | (2006.01) | |
| *A23D 7/005* | (2006.01) | |
| *A23D 7/01* | (2006.01) | |
| *A23P 10/30* | (2016.01) | |
| *A23L 33/12* | (2016.01) | |

(52) U.S. Cl.
CPC .......... *B01J 13/043* (2013.01); *A23D 7/0053* (2013.01); *A23D 7/011* (2013.01); *A23D 9/05* (2013.01); *A23L 33/12* (2016.08); *A23P 10/30* (2016.08)

(58) Field of Classification Search
CPC ...... B01J 13/043; A23L 33/12; A23D 7/0053; A23D 9/05
See application file for complete search history.

(56) References Cited

U.S. PATENT DOCUMENTS

| | | |
|---|---|---|
| 5,601,760 A | 2/1997 | Rosenberg |
| 2008/0095907 A1 | 4/2008 | Augustin et al. |

FOREIGN PATENT DOCUMENTS

| | | | | |
|---|---|---|---|---|
| AU | WO 01/74175 A1 | 10/2001 | | |
| AU | WO 2005/048998 A1 | 6/2005 | | |
| EP | 1 616 486 A1 | 1/2006 | | |
| JP | 08259943 A * | 10/1996 | .............. | A23D 7/06 |
| NL | WO 2008/143507 | 11/2008 | | |
| NL | WO 2009/070010 A1 | 6/2009 | | |
| NL | WO 2009/070011 A1 | 6/2009 | | |
| WO | WO 9401001 A1 * | 1/1994 | .............. | A23D 9/00 |

OTHER PUBLICATIONS

"Is a Denatured Protein still nutritionally beneficial?". Retrieved online Jul. 17, 2013 from www.fitday.com. pp. 1-2.*
"Food Additives". Ed. A. Larry Branen et al. Chapter 23—Emulsifiers. Published 2001 by Marcel Decker. pp. 1-55.*
Machine translation of JP 08-8259943 to Koriyama. Publication date: Oct. 1996. pp. 1-7.*

* cited by examiner

*Primary Examiner* — Jenna A Watts
(74) *Attorney, Agent, or Firm* — Sunit Talapatra; Foley & Lardner LLP

(57) ABSTRACT

The present invention relates to a method for encapsulation of an edible oil using whey protein and a reducing sugar. The edible oil comprises long chain polyunsaturated fatty acids. Also compositions comprising an edible oil obtainable by the method of the invention are provided. The compositions of the invention have good stability to oxidation, good taste and/or odor, and limited diffusion from and into the continuous phase when applied in liquids. The compositions of the invention are particularly suitable for food and pharma applications.

6 Claims, No Drawings

METHOD FOR ENCAPSULATION OF AN EDIBLE OIL, COMPOSITIONS COMPRISING EDIBLE OIL AND THE USE THEREOF

This application is the U.S. National Phase of, and Applicants claim priority from, International Patent Application Number PCT/NL2010/050462 filed 16 Jul. 2010 and Netherlands Patent Application Number 2003224 filed 17 Jul. 2009 which are incorporated herein by reference in their entirety.

BACKGROUND OF THE INVENTION

The invention relates to a method for encapsulation of an edible oil, to compositions comprising edible oil; to food products comprising these compositions; and to the use of these compositions.

Edible oils that contain unsaturated fatty acids, and especially polyunsaturated fatty acids (PUFAs), usually in the form of glyceride esters, have been shown to have beneficial health effects. These health effects include the reduction of cholesterol levels, protection against coronary heart disease and suppression of platelet aggregation. For example, fish oils and fungal oils, which contain for instance the omega-3 and omega-6 fatty acids docosahexaenoic acid (DHA) and eicosapentaenoic acid (EPA), have been used in food products and in nutritional products for its health benefits.

One problem with PUFAs is that these have a tendency to undergo oxidation, which may result in these oils being less active, and which may result in an unpleasant taste and/or odour. This tendency to oxidize increases when the PUFAs are stored for a prolonged time; that is, the shelf or storage stability is relatively short because of the problems associated with the tendency to undergo oxidation.

To protect PUFAs, these have been incorporated into a protective matrix. WO-A-01/74175, for instance, discloses a method to obtain a powder containing an encapsulated oxygen sensitive oil. In this method, a protein solution, and preferably a casein containing solution, is heated in the presence of a carbohydrate in such a manner that a Maillard reaction occurs. Subsequently, oil is added to the mixture, followed by emulsification and drying. The essential Maillard reaction provides resistance to oxidation to the particles.

In EP-A-1 616 486, powdered compositions are described which comprise edible oil, sugar alcohols and reducing sugars. The combination of glucose syrup with mannitol provides the powders with an improved stability in a dry form to oxidation, and better taste and/or odour. However, the achieved stability is not maintained in liquid applications due to the fast solubilization of these powders, releasing the poorly protected oil emulsion droplets that were entrapped in the sugar matrix; that is, these encapsulates only show limited functionality in liquid applications.

WO-A-2008/143507, WO-A-2009/070010 and WO-A-2009/070011 concern methods for manufacturing microcapsules containing a hydrophobic core and a protein-based shell encompassing activation of protein particles, which step is said to be "a special form of protein denaturation" and which step is "crucial for the formation of disulphide cross-links during subsequent encapsulation steps". The activated proteins form a layer at the interface of a hydrophobic dispersed phase and a continuous aqueous phase, and are subsequently cross-linked by forming disulphide cross-links. After this cross-link formation, the product may be spray-dried. Such encapsulates, however, do not provide a good shelf stability in dry form, as is shown herein-below in Examples 4-6 where Example 6 is a system in conformity with WO-A-2009/070010. In addition, these encapsulates cannot be obtained within small particle size ranges (e.g. from 0.5 to 10 μm) by using industrially practical production techniques such as spray drying.

WO-A-2005/048998 teaches a method wherein a core material is selected; a film forming water soluble protein and carbohydrates are dispersed in an aqueous phase and either not heated or heated to such an extent that Maillard reaction products are formed; the core material and the protein-carbohydrate dispersion are mixed and homogenized to obtain an emulsion wherein the core is surrounded by an encapsulating protein-carbohydrate mixture; and optionally spray drying.

US-A-2008/095907 describes an encapsulant for oxygen sensitive oils prepared by reacting an aqueous mixture of a protein (casein, whey protein) with a carbohydrate containing reducing sugar such as glucose and lactose, so that a Maillard reaction occurs. It is state of this document that the Maillard products protect the encapsulated oil from oxidation.

Particularly, in the method of US-A-2008/095907 proteins are first dispersed in water, after which carbohydrates containing reducing groups are added. The solution obtained in heated at 90-100° C. for 30-90 minutes and cooled down to 50° C. Subsequently, an oil heated to 50-60° C. is added to the protein-carbohydrate solution and the resulting mixture is homogenized and spray-dried.

Encapsulated products often suffer from the problem of diffusion of the encapsulated ingredients or diffusion of off-flavour components generated by such ingredients out of the microcapsules into the surrounding phase, when these encapsulated ingredients are incorporated in liquids, such as milk, dairy products, juices, etc. While for powdered compositions mainly the dry storage stability of microcapsules is important, in liquid applications also a longer stability in solution/dispersion and a limited diffusion into the continuous phase are particularly desired. Also diffusion from the continuous phase into the microcapsules is a factor that can affect oxidation; such diffusion processes are dependent on microcapsule characteristics. As a result of diffusion, the encapsulated oils can be exposed to prooxidants present in the liquid, leading to a faster oxidation, which negatively affects the taste and/or odour of the liquid products.

SUMMARY OF THE INVENTION

The present invention aims to provide a method for producing compositions comprising encapsulated edible oil, which has one or more of the following favourable properties, both in powder and dissolved or dispersed state: (i) good stability to oxidation, (ii) good taste and/or odour including good sensory aspect in liquid application, (iii) limited diffusion from and into the continuous phase when applied in liquids, and/or (iv) easy preparation also when small encapsulates (0.5-10 μm in size) are required.

DESCRIPTION OF THE INVENTION

According to the invention, there is provided a method for encapsulation of an edible oil, said method comprising the following subsequent steps of:
(i) providing an aqueous solution of whey protein,
(ii) denaturation of the whey protein, preferably by heating the solution,
(iii) adding a reducing sugar to the solution, (iv) adding an edible oil comprising long chain polyunsaturated fatty acids to the solution, (v) emulsification of the solution, and (vi) spray drying of the solution;

in which method the denatured whey protein is not reacted with reducing sugars under such conditions that Maillard reactions occur.

In this method, steps (ii), (iii) and (iv) may be carried out in any order and even simultaneously (be it before steps (v) and (vi), but preferably are carried subsequently and in the order (ii), (iii), (iv).

Particularly, the method of the invention is carried out under such conditions that Maillard reactions do not occur.

The present invention also provides a composition obtainable by the method of the invention, comprising (i) edible oil comprising long chain polyunsaturated fatty acids, (ii) denaturated whey protein, and (iii) at least one reducing sugar.

A further aspect of the invention is a food product comprising a composition of the invention.

The invention also provides the use of a composition of the invention for producing a food product.

Particularly, it has now been found that denatured whey protein together with one or more reducing sugars, such as glucose syrup, can be used to effectively encapsulate edible oil, especially oil sensitive to oxidation, such as oil containing PUFAs. This effect is not achieved by requiring a Maillard reaction. That is, the denatured whey protein is not reacted with reducing sugars under such conditions that Maillard reactions occur.

A critical step of the method of the invention comprises providing an aqueous solution of whey protein (either a neutral or a weak acidic solution) followed by a protein denaturation. The whey protein is preferably selected from WPC's (whey protein concentrates), more preferably WPC's having a protein/dry matter content of 30-89%, and whey protein isolates (WPI), having a protein/dry matter content of 90% or higher. Suitable whey proteins may be obtained from acid whey or cheese whey. Preferably, whey protein is denatured by heating. Typically, an aqueous solution comprising whey protein is heated at 80° C. for 5 to 30 min to denature the whey protein. More specifically various time-temperature combinations are possible: lower temperatures of about 70 to 75° C. during longer time periods of 20 to 40 minutes; or higher temperatures 85 to 90° C. during shorter time periods of 1 to 5 minutes. It is also possible to apply a heat sterilization, e.g. 10-20 minutes at around 120° C. (batch sterilization) or a few seconds at 140-150° C. (in flowing condition). The most preferred conditions are heating the protein at 65-75° C. for 10-60 minutes; heating at 75-85° C. for 5-30 minutes; or heating at about 85° C. for about 5 minutes. It is intended to essentially avoid time-temperature combinations which give rise to Maillard browning; that is the heating step is selected such that Maillard browning is absent or at least minimal. Maillard browning is not always desired, because of generation of off-flavour or toxic compounds. A minimal degree of denaturation is needed for some desired crosslinking. The above described denaturation conditions do give rise to a minimal denaturation degree of at least about 50-70%.

In a preferred embodiment, the method according to the invention involves conditions causing coagulation of whey protein, preferably either during or shortly after step ii). These conditions are preferably at least similar to the conditions for whey protein denaturation mentioned above, or slightly more severe. Coagulation of protein (formation of protein flocs) may be observed by the naked eye.

In another embodiment, at least a part of the (whey) proteins used in the method are added after step ii). However preferably at least 70% of the protein is added to the solution before step ii) takes place.

Typically, whey protein denaturation gives rise to an increased interfacial oil-water surface deposition of whey protein. Where undenatured whey protein results in interfacial layers with, say, 1 to 1.5 mg protein per $m^2$ surface area of fat, denatured whey protein can give rise to much higher levels in the range of 20 to 30 mg protein per $m^2$ surface area of fat. Without wishing to be bound by any theory, the inventors believe that much thicker interfacial protein layers or protein load positively affects or i.e. decreases, the diffusion processes across such interfacial layers, in the end resulting in better liquid application performance on sensory and stability.

If desired, in the whey protein solution used other protein may be present. These other proteins may be selected from vegetable or animal sources, preferably from dairy sources; more preferably caseinate is present in the solution. Furthermore, fractions or partial hydrolysates of proteins may be present in the solution.

In a preferred embodiment, after cooling, one or more reducing sugars and all other ingredients not being oil (or oil-soluble) are added, followed by the addition of oil. Preferably, all other ingredients not being oil are dissolved or dispersed in water prior to addition of/in the oil. For efficacy reasons, it is also possible to add reducing sugars and all or part of the other ingredients not being oil during or before the protein denaturation step.

Further, the oil and all other ingredients are emulsified at a dry matter content of generally 25 to 45%, more specifically 30 to 40% (w/w). Typically, a pre-emulsification is performed at a temperature of 45-65° C. by means of, e.g., an Ultra Turrax® at 6000 to 10.000 rpm. Subsequently, a two stage high pressure homogeniser can be used, for instance with 60-100 bar for the first stage and 20-40 bar for the second stage of homogenisation.

Drying is preferably carried out by spray drying. Conditions for spray drying are known to, or can be readily determined by, those skilled in the art. The spray dryer operates typically with an inlet temperature of 150-200° C., and an outlet temperature of 60-90° C. The emulsion is preferably spray-dried to a water content of less than 5% by weight (preferably less than 4% by weight). The particulate material (i.e., powder) thus formed is then collected. In accordance with the invention the particle sizes of the presently described encapsulates can be as small as 0.5-10 µm, after redispersing the particulate material with some shear, like stirring.

The compositions of the invention are preferably suitable for use in a food product; however may also be used for other applications such as pharmaceutical applications and especially for oral pharmaceutical applications and agricultural applications. The compositions may be consumed themselves, but they are typically incorporated into a food product or a nutritional supplement before consumption.

The composition of the invention comprises protein, preferably whey protein, in amounts of 3-30 wt. %, preferably 5-25 wt. %. The whey protein is denatured for about at least 50-70%. Other proteins may be present as indicated for the preparation method as set forth above.

The compositions of the invention comprise an edible oil, preferably in amounts of 15-60 wt %, more preferably 20-50 wt %. The edible oil is preferably capable of providing health benefits. Preferably the edible oil comprises long chain polyunsaturated fatty acids.

Under long chain polyunsaturated fatty acids is understood one or more carboxylic acids comprising at least 18 carbon atoms and at least 2 carbon-carbon double bonds. Preferably, the one or more carboxylic acids comprise from 18 to 30 (for example, 18 to 24) carbon atoms and from 2 to 6 carbon-carbon double bonds. The one or more carboxylic acids may be single carboxylic acids or mixtures of two or more carboxylic acids. Each of the one or more carboxylic acids may be in the form of the free acid, an ester or mixtures of free acid and one or more esters. Typically, the one or more carboxylic acids will be in the form of a complex mixture as present in or derived from a natural source. Examples of carboxylic acids are docosahexaenoic acid (DHA), eicosapentaenoic acid (EPA), conjugated linoleic acid (CLA) (including the cis-9, trans-11 and trans-10, cis-12 isomers and mixtures thereof), stearidonic acid, linolenic acid, alpha-linolenic acid, gamma-linolenic acid, arachidonic acid and mixtures thereof. Preferably, the one or more carboxylic acids are selected from DHA, EPA and mixtures thereof. In a mixture of DHA and EPA, the components can be present at any ratio, but a weight ratio of DHA/EPA of 1.0 to 8.0 can be preferred for certain applications, such as for example in infant formulas.

The one or more carboxylic acids may be in the form of free acids (including salts thereof, such as sodium salts), or in the form of esters. Suitable esters include esters of the carboxylic acids with aliphatic alcohols containing from one to six carbon atoms, such as ethyl esters. Other suitable esters include esters with alcohols and polyols that are acceptable in food products. Examples of other esters are mono-, di-, and tri-glycerides and mixtures thereof. Triglyceride esters are particularly preferred, typically as the major component (i.e., greater than 50% by weight) together with mono- and/or di-glycerides, for example up to 35% by weight diglycerides and up to 5% by weight monoglycerides.

The term edible oil covers oils that are non-toxic and can be consumed as part of a normal diet. The edible oil is typically a liquid at 25° C. and atmospheric pressure and is preferably liquid within the temperature range of 0° C. to 25° C. at atmospheric pressure. The oil is generally hydrophobic (for example it is substantially immiscible with water at a 1:1 weight ratio at 25° C.). The oil is preferably obtained or obtainable from a natural source, such as a vegetable oil, an animal oil (including fish oil) or animal fat, or a microbial oil, but may also be synthetic. The oil may be a mixture of oils from different sources or a mixture of a synthetic oil with one or more oils from natural sources.

In some embodiments the edible oil is fish oil. The fish oil may be directly or indirectly obtainable from fish and may be, for example, a fish oil concentrate, a fractionated fish oil or a modified fish oil. Fish oils include oils from mackerel, trout, herring, tuna, salmon, cod, menhaden, bonito and sardines. Fish oil typically contains a mixture of omega-3 and omega-6 PUFA as their triglycerides, together with other components. In a particularly preferred embodiment, the oil is a fish oil concentrate comprising at least 30% by weight DHA and/or at least 20% by weight EPA.

In yet other embodiments the edible oil is a vegetable oil, a fungal oil, or microalgal oil. Fungal oils can contain arachidonic acid (ARA) in glyceride form in higher concentrations. Microalgal oil typically contains DHA in glyceride form in higher concentrations.

Compositions of the invention comprise whey protein (ii) and at least one reducing sugar (iii).

The one or more reducing sugars may be single reducing sugars or mixtures of two or more reducing sugars. Reducing sugars include mono- and disaccharides such as glucose, fructose and maltose. Additionally, reducing sugars encompass trisaccharides and higher saccharides. Oligosaccharides having up to 50 (mono) saccharide moieties, more preferably having up to 45 saccharide moieties, such as 10-45 saccharide moieties, can also be used. In preferred embodiments, glucose syrups are used, preferably those having 20-50 dextrose equivalents (DE). Preferably, the one or more reducing sugars are derived from glucose syrup and, accordingly, are a mixture of reducing sugars, where mono and disaccharides largely can determine the DE or reducing sugar content of such a mixture of reducing sugars. Glucose syrup is a starch hydrolysate containing reducing sugars, dextrin and water and typically contains not less than 25% by weight of reducing sugars calculated as glucose. Very good results are obtained while using glucose syrup having a DE of 30-40. The amount of the one or more reducing sugars in the composition of the invention is preferably from about 20% to 60% by weight, more preferably from 30 to 50% by weight.

In some embodiments, the composition of the invention comprises at least one sugar alcohol. The one or more sugar alcohols may be single sugar alcohols or mixtures of two or more sugar alcohols. Sugar alcohols are polyols obtainable by reduction of saccharides, for example by hydrogenation. Preferred sugar alcohols are selected from mannitol, maltitol, sorbitol and mixtures thereof. Mannitol has been found to be particularly preferred for ease of processing and stability of the composition. The amount of the one or more sugar alcohols in the composition of the invention is preferably from about 1% to about 10% by weight, more preferably from about 3 to about 7% by weight.

The compositions of the invention optionally comprise, in addition to components (i), (ii) and (iii), one or more of a known emulsifier, an antioxidant, a flavouring agent, a free flowing agent and a colouring agent, which types of additives are well-known additives for the person skilled in the field of preparing spray-dried food-products and/or storage stable unsaturated oil products. Emulsifiers include, for example, proteins, protein hydrolysate, as well as low molecular weight emulsifiers, such as polysorbate esters, monoglycerides, diglycerides, propylene glycol or glycerol esters of fatty acids, propylene monostearate, sorbitan monostearate, sorbitan trioleate and lecithin. Particularly preferred are mono- and/or diglycerides of fatty acids, preferably, stearyl mono- and/or diglycerides. Various sources of protein or protein hydrolysate may be employed; milk proteins such as whey protein and caseinate are preferred. Other suitable surface active ingredients or emulsifiers include modified starches, such as Hi Cap®. Such modified starches can, e.g. be modified by reaction with n-octenylsuccinyl anhydride (NOSA). Antioxidants include ascorbic acid and its salts (e.g., sodium salt), tocopherol, carotenoids and extracts from natural products (such as Origanox® from oregano). Free flowing agents, which are also termed anti-caking agents, include silica and tricalcium phosphate. Other optional components include metal chelating and buffering agents such as tetrasodium pyrophosphate, and salts of citrate, ortho phosphate, diphosphate and polyphosphate.

Compositions of the invention have been found to have particularly good shelf life stability and taste when reconstituted in milk or other liquid dairy or non-dairy food products.

The following non-limiting examples illustrate the invention and do not limit its scope in any way. In the examples and throughout this specification, all percentages, parts and ratios are by weight unless indicated otherwise.

EXAMPLES

Examples 1 to 3

The following formulations (Examples 1 to 3) were prepared (values in the table are parts by weight).

|  | Example 1 | Example 2 | Example 3 |
|---|---|---|---|
| Denomega 360 22-3* | 45 | 45 | 45 |
| Mannitol |  | 7 |  |
| Glucose syrup DE 32 | 35.6 | 28.6 | 34.6 |
| Hiprotal 80BL** | 15.4 | 15.4 | 15.4 |
| Na ascorbate | 3 | 3 | 3 |
| Stearyl mono- and diglycerides |  |  | 1 |
| Na polyphosphate | 1 | 1 | 1 |

*Denomega 360 22-3 is a commercial cod liver oil containing about 12% DHA and 12% EPA, by weight based on total fatty acids (ex. Denomega, Fredrikstad, Norway)
**Hiprotal 80BL is a whey protein concentrate (ex DOMO, Zwolle, NL)

Examples 1 to 3 were prepared by spray drying a mixture comprising the various components. More specifically, Examples 1 to 3 were prepared by emulsification of the oils together with all ingredients at a dry matter content of 30% w/w. Thereto, the ingredients other than oil were dissolved or dispersed prior to the addition of the oil. More specifically, where present the stearyl mono- and diglycerides were dispersed in water of 40° C., the whey protein was added and hydrated. The solution was then heated for 30 minutes at 80° C. before addition of the other ingredients. Pre-emulsification was performed at a temperature of 45° C. to 65° C. by means of an Ultra Turrax® at 6000 to 10000 rpm. Subsequently, a two stage high pressure homogeniser was used with 80 bar for the first stage and 30 bar for the second stage of homogenisation. The emulsions thus obtained were then fed into a spray dryer by means of a high-pressure pump operating at a pressure of ~80 bar. The spray dryer was operated at an inlet temperature of 150° C. and an outlet temperature of 75° C. All the obtained powders were analysed for moisture content: values ranging from 1.9% to 2.9% were found.

The compositions of Examples 1 to 3 were stored under air at 40° C. The shelf life stability was determined by a sensory evaluation carried out by a team of panelists by tasting the powder when reconstituted in milk.

Shelf life stability
Storage powder: 40° C., under air

|  | Shelf life in weeks |
|---|---|
| Example 1 | 7-8 |
| Example 2 | 9 |
| Example 3 | 9 |

The results show that the compositions according to the invention containing in addition to glucose syrup also mannitol or stearyl mono- and/or diglycerides showed better performance compared to corresponding compositions using glucose syrup alone. The use of either mannitol or stearyl mono- and/or diglycerides results clearly in an increase in shelf life stability.

Examples 4 and 5 and Comparative Example 6

Examples 1 to 3 were repeated using 30% by weight of DHASCO HM™, a microalgal oil containing about 40% by weight of DHA. Example 6 is a comparative example based on typical compositions used for example 1A according to WO-A-2009/070010.

|  | Example 4 | Example 5 | Comparative Example 6 |
|---|---|---|---|
| DHASCO HM* | 30 | 30 | 30 |
| Mannitol |  | 7 |  |
| Glucose syrup DE 32 | 50.6 | 43.6 |  |
| Maltodextrin DE18 |  |  | 50.6 |
| Hiprotal 80BL | 15.4 | 15.4 | 15.4 |
| Na ascorbate | 3 | 3 | 3 |
| Stearyl mono- and diglycerides | 1 | 1 | 1 |

*DHASCO HM is a commercial microalgal oil containing about 40% by weight DHA based on total amount of fatty acids (ex. Martek, Columbia, USA)

Determination of the shelf life stability was carried out during storage and the results were as follows.

Shelf life stability
Storage powder: 40° C., under air

|  | Shelf life in weeks |
|---|---|
| Example 4 | 7-8 |
| Example 5 | 12 |
| Example 6 | 2 |

The results show that the composition of Example 5 containing mannitol and glucose syrup exhibited improved oxidation stability and taste compared to Example 4, containing only glucose syrup as part of the carbohydrate components present. Moreover, it can be seen that the use of mannitol in combination with stearyl mono- and diglycerides shows superior performance compared to the shelf life stability of example 2. The composition of comparative Example 6 containing maltodextrin as a matrix the shelf life stability is highly affected, a decrease of 6 weeks in shelf life is seen.

Examples 5A en 5B

Comparison with Non-Denatured Protein

The conditions of example 5 were repeated, with the difference that the whey protein was not denatured. (5B), compared to example 5 that included protein denaturation (here 5A).

Results:
Shelf life stability Storage powder: 40° C., under air

|  | Shelf life (weeks) | Free oil (%) |
|---|---|---|
| Example 5 A | 12 | 0.2 |
| Example 5B | 10 | 1.1 |

As can be concluded from this example, the denaturation feature in the invention has the benefit of retarding oxidation of the unsaturated oil, moreover it reduced the release of free oil.

A sensory test showed that example 5A still had a good neutral taste at 12 weeks, whereas the sample 5B had already a slight fishy/sharp/oxidation off-note at 10 weeks.

Examples 7-9

Example 3 was repeated using the compositions given in the following table.

|  | Example 7 | Example 8 | Example 9 |
|---|---|---|---|
| Denomega 360 22-3 | 45 | | |
| DHASCO HM | | 30 | |
| Marinol C38* | | | 30 |
| Glucose syrup DE32 | 34.6 | 49.6 | 49.6 |
| Hiprotal 80BL | 15.4 | 15.4 | 15.4 |
| Na ascorbate | 3 | 3 | 3 |
| Stearyl mono- and diglycerides | 1 | 1 | 1 |
| Na polyphosphate | 1 | 1 | 1 |

*Marinol C38 is a commercial fish oil containing about 40% by weight EPA and DHA based on total amount of fatty acids (ex. Lipid Nutrition, Wormerveer, NL).

The compositions of examples 7-9 were stored at 40° C. under air for up to 9 weeks. A sensory evaluation was carried out by a team of panellists by tasting the powder when reconstituted in milk. The results follow from the following table.

|  | Shelf life in weeks |
|---|---|
| Example 7 | 9 |
| Example 8 | 8-9 |
| Example 9 | 7 |

From the results it can be seen that a change in oil source also slightly can affect the shelf life stability.

Examples 10 and 11

Example 9 was repeated using the compositions given in the following table.

|  | Example 10 | Example 11 |
|---|---|---|
| Marinol C38 | 30 | 30 |
| Glucose syrup | 49.6 | 51.6 |
| Hiprotal 80BL | 15.4 | 15.4 |
| Na ascorbate | 3 | 1 |
| Stearyl mono- and diglycerides | 1 | 1 |
| Na polyphosphate | 1 | 1 |

Determination of the shelf life stability was carried out after storage and the results were as follows.

|  | Shelf life in weeks |
|---|---|
| Example 10 | 7 |
| Example 11 | 5-6 |

The results show that the composition of Example 11 containing less Na ascorbate has a decreased shelf life stability.

The invention claimed is:

1. A method for encapsulation of an edible oil, comprising the consecutive steps of:
   (i) providing an aqueous solution of whey protein,
   (ii) heating the aqueous solution of whey protein to:
      (a) a temperature of 65° C. to 75° C. for 10 to 60 minutes,
      (b) a temperature of 75° C. to 85° C. for 5 to 30 minutes, or
      (c) a temperature of 85° C. to 95° C. for 1 to 5 minutes,
   to obtain whey protein that is at least 70% denatured,
   (iii) adding glucose syrup, mannitol and fatty acid mono- and/or diglycerides to the solution,
   (iv) adding an edible oil comprising long chain polyunsaturated fatty acids to the solution,
   (v) emulsifying the solution, and
   (vi) spray drying the solution;
   wherein the denatured whey protein is not reacted with the glucose syrup under such conditions that Maillard reactions occur.

2. The method of claim 1, wherein the fatty acid mono- and/or diglycerides are stearyl mono- and diglycerides, respectively.

3. The method of claim 1, wherein the resulting encapsulated edible oil remains encapsulated when dispersed in a liquid.

4. The method of claim 1, wherein the edible oil comprises docosahexaenoic acid (DHA), eicosapentaenoic acid (EPA), conjugated linoleic acid, stearidonic acid, linolenic acid, alpha-linolenic acid, gamma-linolenic acid, arachidonic acid or mixtures thereof.

5. The method of claim 1, wherein mannitol is added in an amount between 1% to 10% by weight.

6. The method of claim 5, wherein mannitol is added in an amount between 3% to 7% by weight.

* * * * *